US012665348B2

(12) United States Patent
Wang

(10) Patent No.: US 12,665,348 B2
(45) Date of Patent: Jun. 23, 2026

(54) CABLE PROTECTION DEVICE

(71) Applicant: Changchun Jetty Automotive Technology Co., Ltd., Changchun (CN)

(72) Inventor: Chao Wang, Changchun (CN)

(73) Assignee: Changchun Jetty Automotive Technology Co., Ltd., Changchun (CN)

( * ) Notice: Subject to any disclaimer, the term of this patent is extended or adjusted under 35 U.S.C. 154(b) by 349 days.

(21) Appl. No.: 18/547,309

(22) PCT Filed: Mar. 10, 2022

(86) PCT No.: PCT/CN2022/080187

§ 371 (c)(1),
(2) Date: Aug. 21, 2023

(87) PCT Pub. No.: WO2022/188842

PCT Pub. Date: Sep. 15, 2022

(65) Prior Publication Data

US 2024/0128681 A1 Apr. 18, 2024

(30) Foreign Application Priority Data

Mar. 12, 2021 (CN) ......................... 202110272077.4

(51) Int. Cl.
*H01R 13/58* (2006.01)

(52) U.S. Cl.
CPC ................................ *H01R 13/5812* (2013.01)

(58) Field of Classification Search
CPC .. H01R 13/5812; H01R 13/59; H02G 15/007; F16L 19/065; F16L 5/06
See application file for complete search history.

(56) References Cited

U.S. PATENT DOCUMENTS 5,276,280 A 1/1994 Ball
7,479,027 B1 * 1/2009 Miller .................... H01R 13/59 439/461

(Continued)

FOREIGN PATENT DOCUMENTS

CN 202042705 U 11/2011
CN 202977875 6/2013

(Continued)

OTHER PUBLICATIONS

International Searching Authority, "Written Opinion," issued in connection with International Patent Application No. PCT/CN2022/080187, mailed on May 20, 2022, 9 pages. [English translation included].

(Continued)

*Primary Examiner* — Ross N Gushi
(74) *Attorney, Agent, or Firm* — HANLEY, FLIGHT & ZIMMERMAN, LLC

(57) ABSTRACT

The present disclosure provides a cable protection device, including a sleeve provided with a cable duct and a locking barrel configured to sleeve outside the cable duct. An end of the cable duct is provided with a pressing arm and an opening slot adjacent to the pressing arm. An inner wall of the locking barrel is provided with a pressing bump capable of being inserted into the opening slot. The pressing bump is configured to rotate with the locking barrel to the outer side of the pressing arm to press the pressing arm to move inward. The present disclosure solves the technical problem that the cable is easy to be displaced in the cable protection device, resulting in failure of the cable.

8 Claims, 5 Drawing Sheets

(56) References Cited

U.S. PATENT DOCUMENTS

| | | | |
|---|---|---|---|
| 2018/0241185 | A1 | 8/2018 | Ueno et al. |
| 2021/0013668 | A1 | 1/2021 | Rahm et al. |
| 2021/0098932 | A1 | 4/2021 | Zechmann |

FOREIGN PATENT DOCUMENTS

| | | | |
|---|---|---|---|
| CN | 104577941 | A | 4/2015 |
| CN | 106856280 | A | 6/2017 |
| CN | 108501837 | A | 9/2018 |
| CN | 111555209 | A | 8/2020 |
| CN | 211351585 | U | 8/2020 |
| CN | 112243552 | A | 1/2021 |
| CN | 112864977 | A | 5/2021 |
| CN | 214280790 | U | 9/2021 |
| DE | 19851885 | A1 | 7/2000 |
| EP | 0551664 | B1 | 11/1995 |
| EP | 2731204 | A1 | 5/2014 |
| EP | 3758160 | A1 | 12/2020 |
| JP | 2000113939 | A | 4/2000 |
| JP | 2006014584 | A | 1/2006 |
| JP | 2006147272 | A | 6/2006 |
| JP | 2016149860 | A | 8/2016 |

OTHER PUBLICATIONS

International Bureau, "International Preliminary Report on Patentability," issued in connection with International Patent Application No. PCT/CN2022/080187, mailed on Sep. 12, 2023, 11 pages. [English translation included].

Japan Patent Office, "Office Action" issued for corresponding Japanese Patent Application 2023-554360 mailed on Mar. 11, 2025, 10 pages (English Translation Included).

China National Intellectual Property Administration, "Office Action", issued in connection with CN Patent Application No. 202110272077.4 on Mar. 19, 2025, 17 pages (English Translation Included).

China National Intellectual Property Administration, "Search Report", issued in connection with CN Patent Application No. 202110272077.4 on Mar. 19, 2025, 5 pages (English Translation Included).

European Patent Office, "Communication Pursuant to Article 94(3) EPC", issued in connection with EP Patent Application No. 22 766 364.8 on May 6, 2025, 7 pages.

International Searching Authority, "International Search Report," issued in connection with International Patent Application No. PCT/CN2022/080187, mailed May 20, 2022, 3 pages.

European Patent Office, "Extended European Search Report," issued in connection with European Patent Application No. 22766364.8, dated Jul. 23, 2024, 7 pages.

Japanese Patent Office, "Notice of Reasons for Refusal," issued in connection with Japanese Patent Application No. 2023-554360, dated Sep. 17, 2024, 10 pages. [English translation provided].

China National Intellectual Property Administration, "Decision of Rejection," issued in connection with Chinese Patent Application No. 202110272077.4, dated Jul. 14, 2025. [with English Translation].

Japan Patent Office, "Decision of Dismissal of Amendment," issued in connection with Japanese Patent Application No. 2023-554360, mailed on Sep. 2, 2025, 9 pages. [with English translation].

Vietnam Patent Office, "First Office Action," issued in connection with Vietnam Patent Application No. 1-2023-06324, dated Aug. 20, 2025, 4 pages. [with the English translation].

* cited by examiner

CABLE PROTECTION DEVICE

RELATED APPLICATION

The present application is a U.S. National Stage of International Application No. PCT/CN2022/080187, filed Mar. 10, 2022, which claims priority to Chinese Patent Application No. 202110272077.4, filed on Mar. 12, 2021, and entitled "Cable Protection Device".

TECHNICAL FIELD

The present disclosure relates to the technical field of electrical assembly, in particular to a cable protection device.

BACKGROUND

Cable sheaths are commonly used in electrical assembly to secure and protect cables. For example, when a plurality of cables are butt-connected, the cable connection is placed within the cable sheath, which can prevent personnel and other equipment from directly contacting the cable connection and reduce the risk of electric shock. When the cable needs to be arranged on a vehicle, the cable sheath can be installed on the vehicle body, and the cable passes through the cable sheath, which can play a role of limiting and protecting the cable. The cable sheath used in the electrical assembly of new energy vehicles mainly plays the protective role of fixing and protecting the wire harness, and has the function of flame retardant, waterproof and preventing the wire harness from being damaged by external forces.

After the cable passes through the cable sheath, the cable is sometimes subjected to the action of an external force, resulting in displacement of the cable relative to the cable sheath, which may cause the cable to detach from the fixed connection position and cause circuit failure. If the cable is a high-voltage wire harness and the high-voltage wire harness is displaced, the position of the end of the high-voltage wire harness and the length of one end of the high-voltage wire harness protruding out of the cable sheath change, which may cause interference to the function and assembly of the high-voltage wire harness. For automobiles, the reliability of the cable is required to be high, and cable failure will adversely affect the safety of the whole automobile.

SUMMARY

An object of the present disclosure is to provide a cable protection device, so as to solve the technical problem that the cable is easily displaced in the cable protection device, resulting in failure of the cable.

The above object of the present disclosure can be achieved by adopting the following technical solutions.

The present disclosure provides a cable protection device including a sleeve provided with a cable duct and a locking barrel configured to sleeve outside the cable duct. An end of the cable duct is provided with a pressing arm and an opening slot adjacent to the pressing arm. An inner wall of the locking barrel is provided with a pressing bump capable of being inserted into the opening slot, and the pressing bump is configured to rotate with the locking barrel to an outer side of the pressing arm to press the pressing arm to move inward.

The disclosure has the following features and advantages:

To use the cable protection device, the locking barrel is sleeved on the cable duct, and then one end of the cable passes through the cable duct and passes through the locking barrel. In the process of inserting the cable into the cable duct, as shown in FIG. 4, the pressing bump of the locking barrel is inserted into the opening slot, so that the pressing arm is not pressed by the pressing bump, and the size of the hole of the end of the cable duct is large, which reduces the resistance between the cable duct and the moving cable, and facilitates the cable to pass through the cable duct. After the cable has been adjusted into place, the locking barrel is rotated to drive the pressing bump to rotate to the outer side of the pressing arm, where the pressing bump presses the pressing arm inward, and makes the pressing arm move inward to reduce the size of the hole at the end of the cable duct. Therefore, the pressing arm presses against the outer wall of the cable to prevent the cable duct from displacing, thereby keeping the position of the cable stable, reducing the risk of the cable disengaging from the fixed connection position, and reducing failure of the cable.

BRIEF DESCRIPTION OF DRAWINGS

The following drawings are intended only to schematically illustrate and explain the disclosure and do not limit the scope of the present disclosure. In the drawings.

DESCRIPTION OF EMBODIMENTS

For a clearer understanding of the technical features, objectives and effects of the present disclosure, specific embodiments of the present disclosure will now be described with reference to the accompanying drawings. In description of the present disclosure, "a plurality of" means two or more, unless otherwise indicated.

Figure 4:
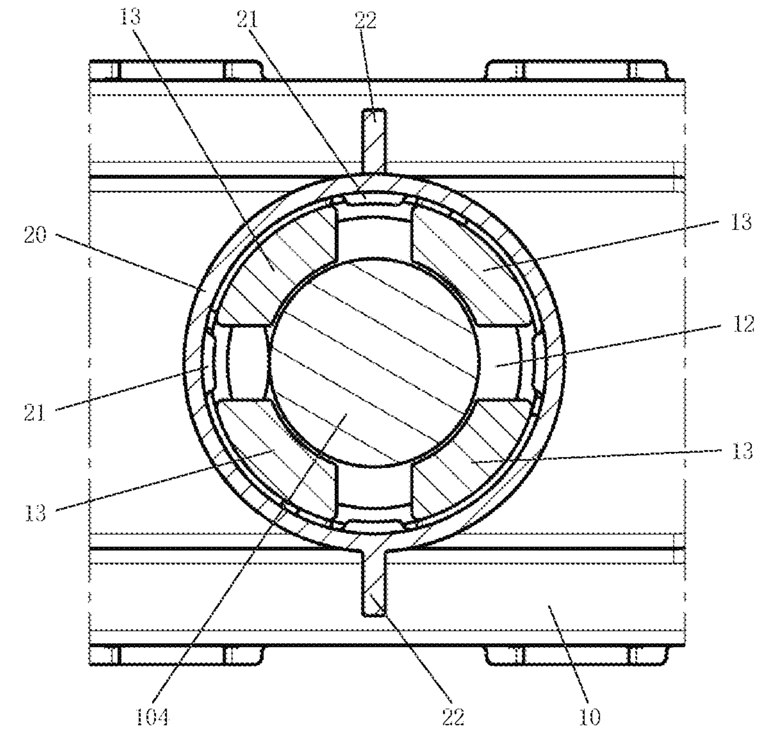
FIG. 4 is a right side view of the cable protection device shown in FIG. 1 in a first state.
Figure 5:
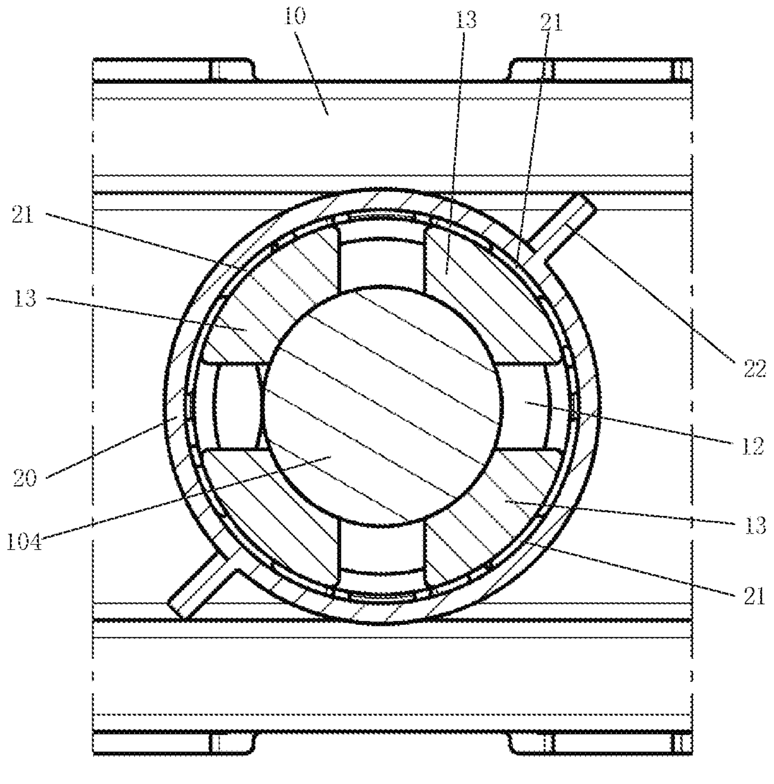
FIG. 5 is a right side view of the cable protection device shown in FIG. 1 in a second state.

The present disclosure provides a cable protection device, as shown in FIGS. 1, 2, 6A and 6B, the cable protection device includes a sleeve 10 provided with a cable duct 11, and a locking barrel 20 configured to sleeve outside the cable duct 11. An end of the cable duct 11 is provided with a pressing arm 13 and an opening slot 12 adjacent to the pressing arm 13. The inner wall of the locking barrel 20 is provided with a pressing bump 21 capable of being inserted into the opening slot 12. As shown in FIGS. 4 and 5, the pressing bump 21 is configured to rotate with the locking barrel 20 to an outer side of the pressing arm 13 to press the pressing arm 13 to move inward.

To use the cable protection device, the locking barrel 20 is sleeved on the cable duct 11, and then one end of the cable 104 passes through the cable duct 11 and passes through the locking barrel 20. In the process of inserting the cable 104 into the cable duct 11, as shown in FIG. 4, the pressing bump 21 of the locking barrel 20 is inserted into the opening slot 12, so that the pressing arm 13 is not pressed by the pressing bump 21, and the size of the hole of the end of the cable duct 11 is large, which reduces the resistance between the cable duct 11 and the moving cable 104, and facilitates the cable 104 to pass through the cable duct 11. After the cable 104 has been adjusted into place, the locking barrel 20 is rotated to drive the pressing bump 21 to rotate to the outer side of the pressing arm 13, where the pressing bump 21 presses the pressing arm 13 inward, and makes the pressing arm 13 move inward to reduce the size of the hole at the end of the cable duct 11. Therefore, the pressing arm 13 presses against the outer wall of the cable 104 to prevent the cable duct 11 from displacing, thereby keeping the position of the cable 104 stable, reducing the risk of the cable 104 disengaging from the fixed connection position, and reducing failure of the cable 104.

Figure 7:
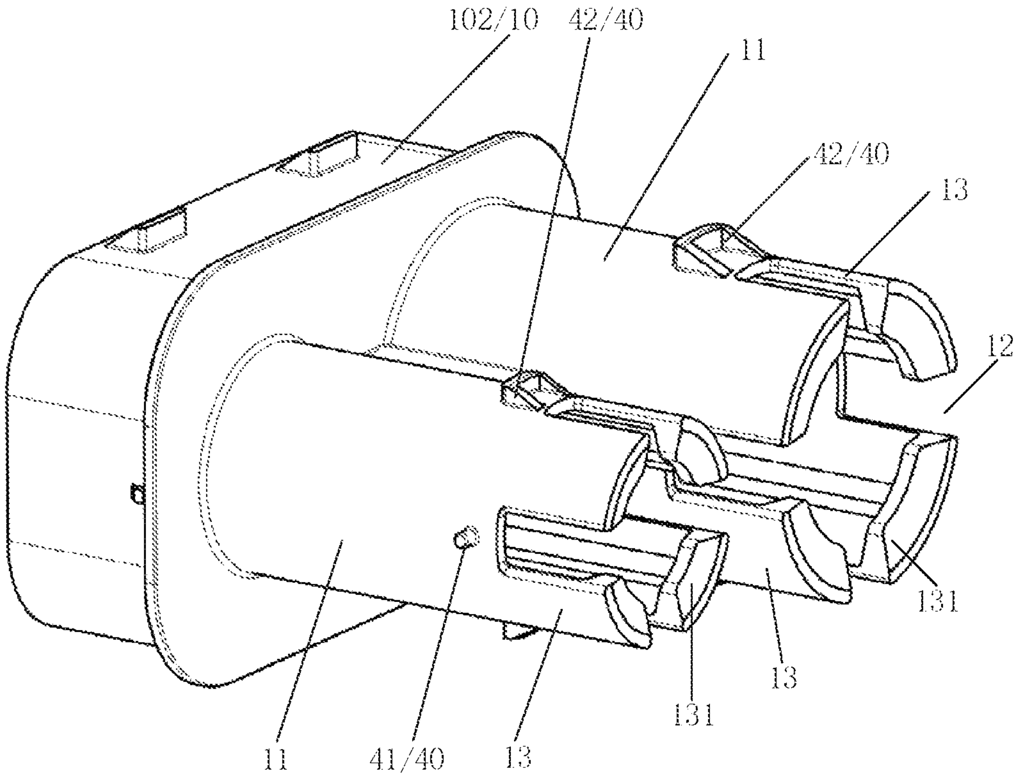
FIG. 7 is a structural schematic diagram of the sleeve of the cable protection device according to another embodiment of the present disclosure.
Figure 8:
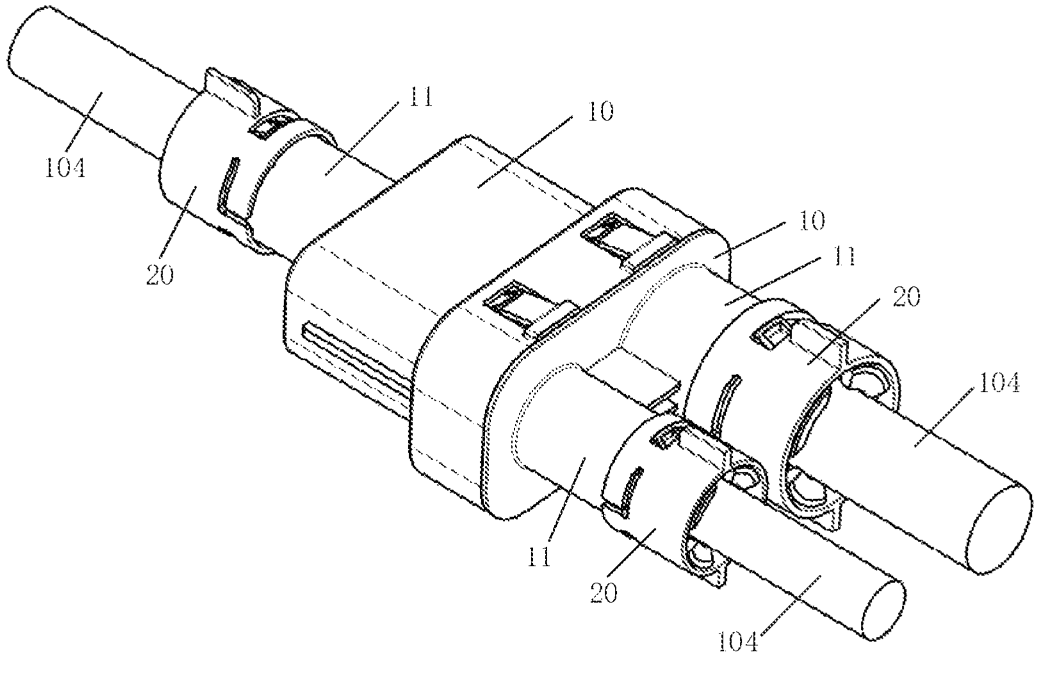
FIG. 8 is a schematic diagram of a cable installed in the cable protection device.

The sleeve 10 is provided with an accommodating cavity 101 for accommodating and carrying a wire. The opening slot 12 is capable of receiving the pressing bump 21, which is disposed to pass through the opening slot 12 and is capable of moving in the opening slot 12 along the longitudinal direction of the cable duct 11, and the pressing bump 21 cooperates with the opening slot 12 to play a positioning role. In the process of sleeving the locking barrel 20 on the cable duct 11, the pressing bump 21 and the opening slot 12 guide the locking barrel 20 to move along the bus of the cable duct 11. As shown in FIGS. 7 and 8, the sleeve 10 may be provided with a plurality of cable ducts 11, and multi-stranded cables 104 respectively pass through the cable ducts 11. The locking barrel 20 connected to each cable duct 11 prevents the displacement of each stranded of cable 104. As shown in FIG. 8, the cable protection device includes a plurality of sleeves 10 that are butted in sequence and through which the cable 104 passes. The locking barrels 20 at two ends respectively lock the positions of the two ends of the cable 104, so as to reduce the displacement of the cable 104 and keep the cable 104 stably held in the cable protection device. The connection position of the multi-strand cables 104 may be disposed in the cable protection device, so as to prevent the multi-strand cables 104 from being disconnected and ensure the reliability of the connection of the cable 104.

The pressing bump 21 presses the pressing arm 13 inward to make the pressing arm 13 deform inward and press the cable 104, so that a friction force is generated between the pressing bump 21 and the pressing arm 13 to prevent relative movement of the locking barrels 20 and the cable duct 11. In an embodiment of the present disclosure, the cable protection device includes at least one locking bump 40 and at least one locking groove 30. At least one locking bump 40 is disposed on the outer wall of the cable duct 11, and at least one locking groove 30 is disposed on the locking barrel 20; and/or at least one locking bump 40 is disposed on the inner wall of the locking barrel 20, and at least one locking groove 30 is disposed on the cable duct 11. The locking bump 40 is configured to be embedded in the locking groove 30 to define the position of the locking barrel 20 on the cable duct 11, which is beneficial to keep the position of the locking barrel 20 on the cable duct 11 stable, and keep the locking barrel 20 and the cable duct 11 in the state shown in FIG. 5, where the pressing arm 13 is pressed inwardly against the cable 104 by the pressing bump 21.

As shown in FIGS. 2, 3, 6A, 6B and 7, the locking bump 40 is disposed on the outer wall of the cable duct 11, and the locking groove 30 is disposed on the locking barrel 20. Compared to being disposed on the inner wall of the cable tube 11, the locking bump 40 being disposed on the outer wall of the cable tube 11 is easier to mold, and reduces the manufacturing difficulty of the cable protection device. The position of the locking barrel 20 on the cable duct 11 is defined by matching the locking groove 30 with the locking bump 40. The locking groove 30 and the locking bump 40 are disposed in a manner not limited to those shown in FIGS. 2, 3, 6A, 6B and 7. As another embodiment, the locking bump 40 is disposed on the inner wall of the locking barrel 20, and the locking groove 30 is disposed on the cable duct 11. As an alternative embodiment, at least one locking bump 40 is disposed on the inner wall of the locking barrel 20, and the mating locking groove 30 is disposed on the cable duct 11; and at least one locking bump 40 is disposed on the outer wall of the cable duct 11, and the mating locking groove 30 is disposed on the locking barrel 20.

Figure 2:
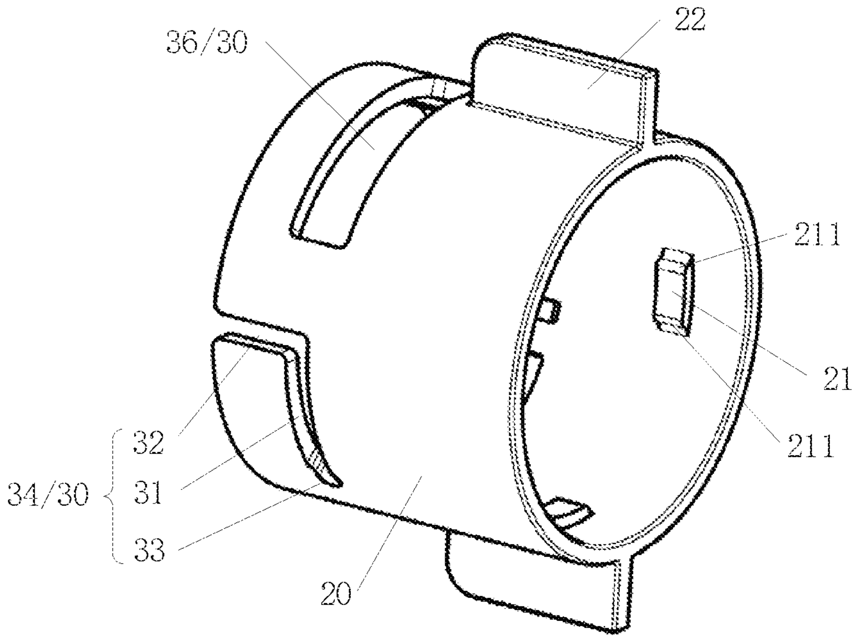
FIG. 2 is a structural schematic diagram of a locking barrel of the cable protection device shown in FIG. 1, viewed from a first perspective.

The locking bump 40 is configured to be embedded in the locking groove 30, and the locking groove 30 may be a through groove or a concave groove. When the locking groove 30 is disposed on the locking barrel 20, optionally, as shown in FIG. 2, the locking groove 30 is a through groove for convenience of manufacturing.

Figure 3:
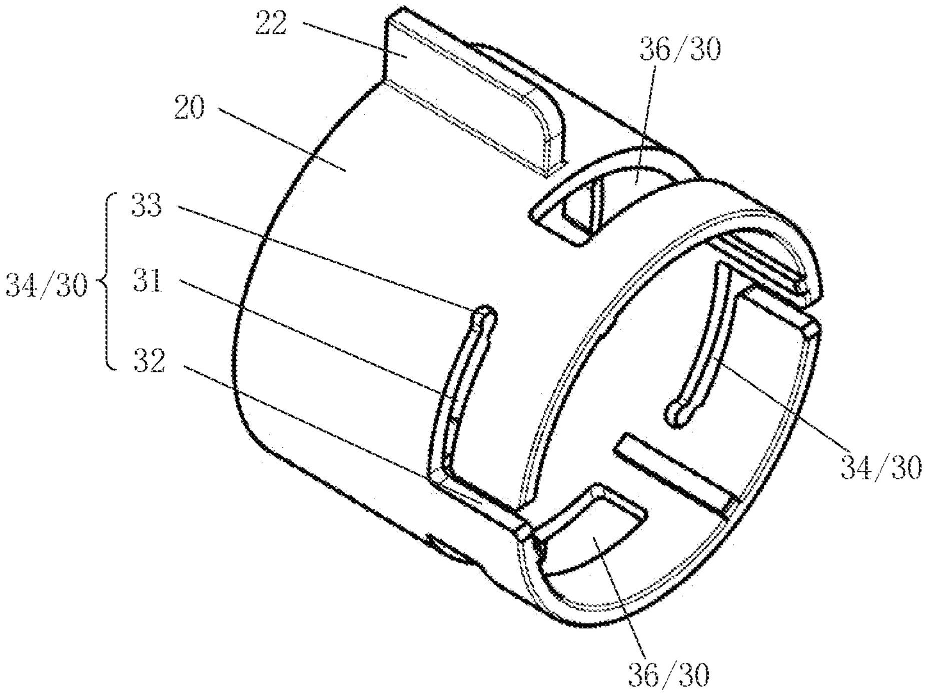
FIG. 3 is a structural schematic diagram of a locking barrel of the cable protection device shown in FIG. 1, viewed from a second perspective.

In an embodiment, the locking groove 30 includes a circumferential groove portion 31 extending along a planar circumferential line around the axis of the cable duct 11, and the locking bump 40 is configured to be rotatably embedded in the circumferential groove portion 31. As shown in FIGS. 2 and 3, the locking bump 40 can rotate in the circumferential groove portion 31 along a plane circumferential line around the axis of the cable duct 11, so that the locking barrel 20 rotates without axial displacement. By rotating the locking barrel 20 by a small angle, it is possible to move the pressing bump 21 to the outer wall of the pressing arm 13 to press and lock the cable 104.

Further, the locking groove 30 includes an axial groove portion 32 which is in communication with the circumferential groove portion 31. The axial groove portion 32 is configured to guide the locking bump 40 to enter the circumferential groove portion 31. When the locking barrel 20 is sleeved on the cable duct 11, the locking bump 40 first enters and moves along the axial groove portion 32, and then moves into the circumferential groove portion 31, so as to facilitate smooth installation of the locking barrel 20.

Further, an end of the circumferential groove portion 31 has a locking portion 33 configured to press the locking bump 40 inward by a side wall of the locking portion 33. As shown in FIG. 3, the size of the locking portion 33 is smaller compared to the groove width of the starting section of the circumferential groove portion 31. After the locking bump 40 enters the locking portion 33, the side wall of the locking portion 33 presses the locking bump 40 to generate resistance to the locking bump 40 to prevent the locking bump 40 from retreating, thereby holding the locking bump 40 in the locking portion 33. Exemplarily, the locking bump 40 is of cylindrical shape, and the shape of the locking portion 33 is matched with the locking bump 40. The locking portion 33 may be a circular hole. The side wall of the locking portion 33 surrounds the locking bump 40, and the locking portion 33 is provided with an opening for the locking bump 40 to enter the locking portion 33. The opening in a natural state is smaller than the locking bump 40, so as to prevent the locking bump 40 from exiting the locking portion 33 after the locking bump 40 enters the locking portion 33. As shown in FIG. 3, the axial groove portion 32, the circumferential groove portion 31, and the locking portion 33 are connected in sequence to constitute a positioning groove 34. The locking bump 40 constitutes a positioning column 41 which can move in the positioning groove 34 to ensure the smooth movement of the locking barrel 20, and when the positioning column 41 moves to the locking portion 33, locking is achieved.

In another embodiment, the locking groove 30 includes a spiral groove portion extending along a spiral line around the axis of the cable duct 11. The locking bump 40 moves along the spiral groove portion, and the trajectory of movement of the locking bump 40 is a spiral line around the axis of the cable duct 11. Therefore, rotation of the locking barrel 20 can drive the pressing bump 21 to rotate to the outside of the pressing arm 13, and the locking bump 40 is threadedly engaged with the spiral groove portion. The locking barrel 20 is rotated to generate a frictional force between the locking bump 40 and the spiral groove portion, and the position of the locking barrel on the cable duct 11 can be stabilized by the frictional force.

In still another embodiment, as shown in FIGS. 2, 3, 6A, 6B and 7, the locking groove 30 is a circumferential clamping groove 36, and the locking bump 40 is a first locking clamping block 42. The first locking clamping block 42 is configured to be clamped with the circumferential clamping groove 36 to prevent the locking barrel 20 from moving relative to the cable duct 11 in the axial direction of the cable duct 11, and the first locking clamping block 42 can rotate in the circumferential clamping groove 36. The axial position of the locking barrel 20 on the cable duct 11 is defined by the circumferential clamping groove 36 and the first locking clamping block 42. The first locking clamping block 42 can rotate in the circumferential clamping groove 36, thereby allowing the locking barrel 20 to rotate on the cable duct 11.

Figure 6A:
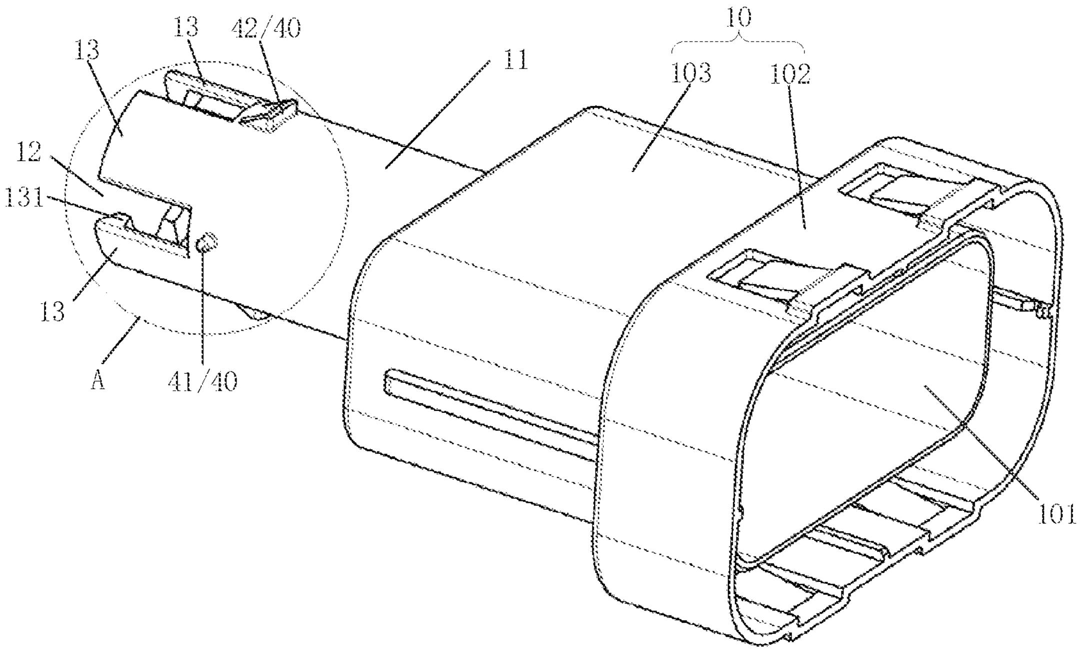
FIG. 6A is a structural schematic diagram of a sleeve in the cable protection device shown in FIG. 1.
Figure 6B:
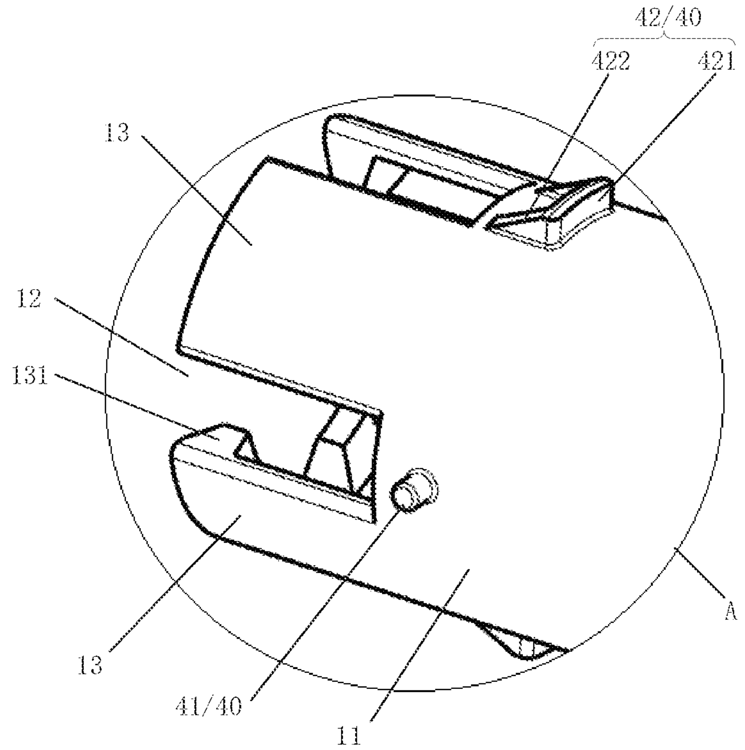
FIG. 6B is an enlarged fragmentary view of position A in FIG. 6A.

As shown in FIGS. 6A, 6B and 7, the first locking clamping block 42 includes a clamping block upright plate 421 configured to abut against an inner wall of the circumferential clamping groove 36 such that the first locking clamping block 42 is clamped to the circumferential clamping groove 36. In an embodiment, the first locking clamping block 42 includes a clamping block rib plate 422 connected to the clamping block upright plate 421. The clamping block rib plate 422 increases the strength of the first locking clamping block 42, and makes the first locking clamping block 42 not easily to be deformed. Specifically, the clamping block rib plate 422 may be provided extending in the longitudinal direction of the cable duct 11.

In another embodiment, the locking groove 30 is an axial clamping groove, and the locking bump 40 is a second locking clamping block. The axial clamping groove and the second locking clamping block are configured as the second locking clamping block being clamped in the axial clamping groove, so as to prevent the locking barrel 20 from rotating about the axis of the cable duct 11 relative to the cable duct 11. The locking barrel 20 is sleeved outside the cable duct 11, then the locking barrel 20 is rotated until the second locking clamping block enters the axial clamping groove which prevents the locking barrel 20 from rotating, thereby defining the position of the locking barrel 20. Exemplarily, the locking barrel 20 is provided with an axial clamping groove and a circumferential groove portion 31, and the position of the locking barrel 20 is locked by the cooperation of the axial clamping groove and the axial groove portion 32, which has the advantages of accurate positioning and reliable locking.

Further, the cable protection device includes a plurality of locking bumps 40 and a plurality of locking grooves 30. The plurality of locking bumps 40 are disposed on the outer wall of the cable duct 11, and the plurality of locking grooves 30 are disposed on the locking barrel 20. As shown in FIGS. 2, 3, 6A, 6B and 7, at least one of the locking grooves 30 includes a circumferential groove portion 31 extending along a planar circumferential line around the axis of the cable duct 11. At least one of the locking bumps 40 is rotatable in the circumferential groove portion 31. At least one of the locking grooves 30 is a circumferential clamping groove 36, and at least one of the locking bumps 40 is a first locking clamping block 42. The first locking clamping block 42 can be clamped with the circumferential clamping groove 36, so as to prevent the locking barrel 20 from moving relative to the cable duct 11 in the axial direction of the cable duct 11. The first locking clamping block 42 can rotate in the circumferential clamping groove 36. The position of the locking barrel 20 is locked by the cooperation of the circumferential clamping groove 36 and the circumferential groove portion 31, which has the advantages of accurate positioning and reliable locking.

As shown in FIG. 2, the pressing bump 21 has a bump inclined surface 211 for being in lap joint with the pressing arm 13. When the locking barrel 20 is rotated, the bump inclined surface 211 guides the pressing bump 21 to rotate to the outer side of the pressing arm 13. At the beginning, the pressing bump 21 is disposed to pass through the opening slot 12, and the bump inclined surface 211 is in contact with the side wall of the pressing arm 13. When the locking barrel 20 is rotated, the bump inclined surface 211 serves as a guide, which facilitates the movement of the pressing bump 21 toward the outer side of the pressing arm 13.

As shown in FIGS. 1, 6A, 6B and 7, the inner wall of the pressing arm 13 is provided with an arm bump 131, and the pressing arm 13 abuts against the cable 104 through the arm bump 131, which is advantageous in concentrating the pressing force on the cable 104 on the arm bump 131 and generating greater resistance, so as to better prevent the displacement of the cable 104 and improve the stability of the position of the cable 104.

The sleeve 10 includes an accommodating cylinder 103 and a butting cylinder 102, and the accommodating cavity 101 is disposed in the accommodating cylinder 103 and the butting cylinder 102. The accommodating cylinder 103 and the butting cylinder 102 carry wires and protect the wires to meet the requirements of flame retardancy and resistance to damage.

The cable duct 11 is shaped in a circular contour to match the contour of the wire, and alternative contour schemes are ellipse, square, rectangle, rectangle with rounded corners, triangle, trapezoid, parallelogram, rhomboid, polygon, and the like. The diameter of the cable duct 11 is designed according to different specifications of the wire, and may be integers, e.g., 10 mm diameter, 20 mm diameter, 30 mm diameter, etc., or non-integers, e.g., 11.2 mm diameter, 12.2 mm diameter, 13.2 mm diameter, etc. The draft angle of the cable duct 11 may be designed to be exemplarily 1 degree according to the mold depanning requirement, or may be changed to other angle values, for example, 1.5 degrees, 2 degrees, or 0.5 degrees, etc. according to different lengths. The cable duct 11 and the accommodating cylinder 103 are vertically connected to one another to save materials and meet the strength requirement.

At the outer contour of the accommodating cylinder 103 and the butting cylinder 102, positioning ribs of different shapes are arranged as positioning points for assembly according to different assembly requirements. The shape of the positioning rib may be rectangular, triangular or cylindrical. The size (length and thickness) of the positioning rib may be designed according to different assembly requirements, and may be an integer (e.g., 10 mm, 20 mm, 30 mm, etc.) or a non-integer (e.g., 11.2 mm, 12.2 mm, 13.2 mm, etc.). In order to prevent the sharp part from damaging the peripheral environment and avoid the sharp part from injuring the personnel, the outer contours of the accommodating cylinder 103 and the butting cylinder 102 are rounded, and an alternative solution is bevel processing, and the size of the rounded and beveled corners can be selected according to different specifications, and may be integers (e.g., 1 mm, 2 mm, 3 mm, etc.) or non-integers (e.g., 1.2 mm, 2.2 mm, 3.2 mm, etc.).

The wall thicknesses of the sleeve 10 and the locking barrel 20 are set according to different strength requirements, process requirements, etc., and may be an integer (e.g., 1 mm, 2 mm, 3 mm, etc.) or a non-integer (e.g., 1.1 mm, 2.1 mm, 3.1 mm, etc.).

The color of the sleeve 10 and the locking barrel 20 is orange for warning, and may be other colors such as red, purple, blue, and the like.

According to different strength requirements and different temperature resistance levels, as well as different material characteristics requirements, different kinds of materials are selected for the sleeve 10 and the locking barrel 20, such as one or more selected from the group consisting of polyamide, polyethylene, polypropylene, polystyrene, polymethyl methacrylate, polyvinyl chloride, ethylene propylene diene rubber, nylon, polycarbonate, polytetrafluoroethylene, polyethylene terephthalate, polyoxymethylene, and polyvinyl chloride. The materials are required to meet the requirements of flame retardancy and strength.

The surfaces of the sleeve 10 and the locking barrel 20 are treated with a spark pattern in order to increase the aesthetic effect and to increase the hand feeling. The specifications of the spark pattern are selected according to different specifications, such as Ra0.16, Ra0.25, Ra0.32, and the like.

The number of the first locking clamping block 42 may be selected to be two according to the installation requirements, or may be selected to other numbers according to different specifications, such as 3, 5, 6 and so on. Exemplarily, there are two upper and two lower first locking clamping blocks 42 in the overall layout according to the installation requirements, this layout is conducive to uniform stress during installation and meets the strength requirements for anti-removal. Other different layout schemes can be used according to different installation requirements, for example, one upper and one lower first locking clamping blocks 42, or one upper and two lower first locking clamping blocks 42, or three upper and three lower first locking clamping blocks 42, and the like.

The overall shape of the first locking clamping block 42 may be selected as a trapezoid with an inclined surface according to the installation requirements, and alternative schemes are circle, square, rectangle, triangle, parallelogram, rhomboid, polygon, and the like. The top surface of the clamping block rib plate 422 of the first locking clamping block 42 is an inclined surface, and the inclined surface serves mainly as an assembly lead-in during installation. The angle between the inclined surface and the axis of the sleeve 10 may be selected to be 10 degrees depending on the installation requirements, and may be changed to other angles according to different specifications, such as 15 degrees, 20 degrees, 25 degrees, etc.

The shape of the positioning column 41 may be selected to be cylindrical according to the installation requirements, and alternatively may be circular, square, rectangular, rectangular, triangular, parallelogram, rhombus, polygon, or the like. The diameter size of the positioning column 41 is designed according to different specifications of the wire, and may be an integer (e.g., 10 mm, 20 mm, 30 mm, etc.), or a non-integer (e.g., 11.2 mm, 12.2 mm, 13.2 mm, etc.). The height of the positioning column 41 is designed according to different installation requirements, and may be an integer (e.g., 10 mm, 20 mm, 30 mm, etc.) or a non-integer (e.g., 11.2 mm, 12.2 mm, 13.2 mm, etc.).

The number of the arm bump 131 is exemplarily 4 according to the installation requirements, and may be changed to other numbers according to different specifications, for example, 5, 6, 8, and the like. The width and height of the arm bump 131 is designed according to different installation requirements, and may be an integer (e.g., 10 mm, 20 mm, 30 mm, etc.) or a non-integer (e.g., 11.2 mm, 12.2 mm, 13.2 mm, etc.). The shape of the locking surface of the arm bump 131 is exemplarily an isosceles trapezoid, and may alternatively be circular, square, rectangular, rectangular, triangular, parallelogram, rhombus, polygon, or the like. The inclined angle of the arm bump 131 may be selected as 45 degrees according to the installation requirements, and may be changed to other angles according to different specifications, such as 60 degrees, 30 degrees, 15 degrees, etc.

The circumferential clamping groove 36 is in the shape of a rectangular window, and may alternatively be circular, square, rectangular, rectangular, triangular, parallelogram, rhombus, polygon, or the like. A certain space is reserved in the circumferential clamping groove 36 for the rotation space of the first locking clamping block 42 after assembly. The size of the space is designed according to the size of the first locking clamping block 42, and may be an integer (for example, 1 mm, 2 mm, 3 mm, etc.) or a non-integer (for example, 1.2 mm, 2.2 mm, 3.2 mm, etc.). The number of the circumferential clamping groove 36 may be selected to be two according to the installation requirements, or may be selected to other numbers according to different specifications, such as 3, 5, 6 and so on. There are exemplarily two upper and two lower circumferential clamping groove 36 in the overall layout according to the installation requirements, this layout is conducive to uniform stress during installation and meets the strength requirements for anti-removal. Other different layout schemes can be used according to different installation requirements, for example, one upper and one lower circumferential clamping groove 36, or one upper and two lower circumferential clamping groove 36, or three upper and three lower circumferential clamping groove 36, and the like.

The shape of the positioning groove 34 is exemplarily L-shaped as shown in FIG. 3 according to installation requirements and rotation requirements, and may alternatively be V-shaped, U-shaped, Z-shaped or the like. An opening end of the positioning groove 34 is designed with a lead-in bevel, so that the opening end of the positioning groove 34 is funnel-shaped to play an assembly lead-in role during installation. The inclined angle may be selected as 45 degrees according to the installation requirements, and may be changed to other angles according to different specifications, such as 60 degrees, 30 degrees, 15 degrees, etc.

The positioning groove 34 is designed with a locking portion 33 according to the rotation requirements, and the locking portion 33 may be a hole. The shape of the hole is exemplarily circular and may alternatively be square, rectangular, rectangular, triangular, parallelogram, rhombus, polygonal, etc. The diameter size of the locking portion 33 is designed according to different specifications, and may be an integer (e.g., 10 mm, 20 mm, 30 mm, etc.), or a non-integer (e.g., 11.2 mm, 12.2 mm, 13.2 mm, etc.). There are one left and one right positioning grooves 34 in the overall layout according to the rotation requirements, this layout is conducive to uniform stress during rotation and meets the strength requirements for anti-removal. Other different layout schemes can be used according to different installation requirements, for example, one left positioning groove 34, or one left and two right positioning grooves 34, or two left and two right positioning grooves 34, and the like.

The number of the pressing bump 21 is exemplarily 4 according to the installation requirements, and may be changed to other numbers according to different specifications, for example, 5, 6, 8, and the like. The width size and height size of the pressing bump 21 are designed according to different installation requirements, and may be an integer (e.g., 10 mm, 20 mm, 30 mm, etc.) or a non-integer (e.g., 11.2 mm, 12.2 mm, 13.2 mm, etc.). The shape of the pressing bump 21 is exemplarily an isosceles trapezoid, and the sides of the isosceles trapezoid are configured as bump inclined surfaces 211. The angle of the bump inclined surface 211 is exemplarily 45 degrees according to installation requirements, and may be changed to other angles according to different specifications, such as 60 degrees, 30 degrees, 15 degrees, etc., and may alternatively be circular, square, rectangular, rectangular, triangular, parallelogram, rhombus, polygon, or the like.

The number of the handle 22 may be selected to be two according to the installation requirements, or may be selected to other numbers according to different specifications, such as 3, 5, 6 and so on. There are exemplarily two upper and two lower handles 22 in the overall layout according to the installation requirements, this layout is conducive to uniform stress during installation and meets the strength requirements for anti-removal. Other different layout schemes can be used according to different installation requirements, for example, one upper and one lower handles 22, or one upper and two lower handles 22, or three upper and three lower handles 22, and the like. The handle 22 is rectangular in shape, and may alternatively be circular, square, rectangular, triangular, parallelogram, rhombus, polygonal, or the like. The width and height of the handle 22 are designed according to different installation requirements, and may be an integer (e.g., 10 mm, 20 mm, 30 mm, etc.) or a non-integer (e.g., 11.2 mm, 12.2 mm, 13.2 mm, etc.).

The overall shape of the locking barrel 20 is circular, and may alternatively be oval, square, rectangular, rectangular, triangular, parallelogram, rhombus, polygon, or the like.

Figure 1:
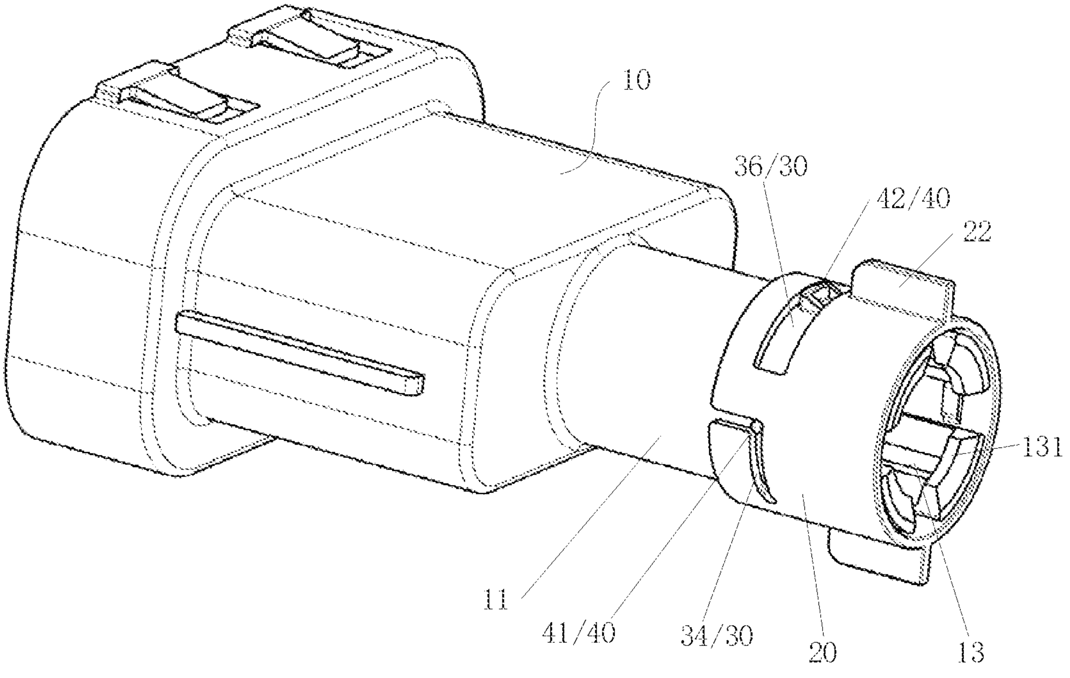
FIG. 1 is a structural schematic diagram of a cable protection device provided by the present disclosure.

The operating principle of the cable protection device shown in FIG. 1 is as follows: the first locking clamping block 42 and the circumferential clamping groove 36 are guided by the inclined surface of the first locking clamping block 42 and achieve the clamping function. The positioning column 41 and the positioning groove 34 constitute an L-shaped trajectory system for introduction and rotational positioning. The axial groove portion 32 is configured as a short side of the L-shaped trajectory, the circumferential groove portion 31 is configured as a long side of the L-shaped trajectory, and the connection position of the axial groove portion 32 and the circumferential groove portion 31 is configured as an L-shaped trajectory corner point.

When the locking barrel 20 is assembled, the positioning column 41 is guided and enters the positioning groove 34 by the lead-in bevel at the opening end of the positioning groove 34, and then moves along the short side of the L-shaped trajectory of the positioning groove 34. When the positioning column 41 reaches the L-shaped trajectory corner point, the assembly position is locked, and at the same time the first locking clamping block 42 and the circumferential clamping groove 36 are clamped in position, thus completing the preassembly.

After the preassembly, the operator holds the handle 22 and performs a rotation operation to rotate the entire locking barrel 20 by 45 degrees. During rotation, the positioning column 41 moves along the long side of the L-shaped trajectory of the positioning groove 34 to reach a predetermined position, then the positioning column 41 moves to the end of the positioning groove 34, i.e. the locking portion 33, thus completing the final position locking, and the rotation action is terminated. During this action, the first locking clamping block 42 and the circumferential clamping groove 36 are always in a clamped state, ensuring that the locking barrel 20 will not be disengaged.

Before the rotation, the gap between the inner side of the arm bump 131 and the outer side of the lead wire is maintained at a fixed value, and the lead wire and the sleeve 10 are in a loose state, so that the guidance and the installation of the sleeve 10 can be ensured. Meanwhile, the pressing bump 21 and the outer side of the arm bump 131 are in a misaligned state without interference, so that the installation of the locking barrel 20 and the sleeve 10 can be ensured.

After the rotation, as the whole locking barrel 20 rotates by 45 degrees, the pressing bump 21 also rotates by 45 degrees. Since the pressing arm 13 is in a non-rotating state, the inner side of the pressing bump 21 forcibly enters the outer side of the pressing arm 13. Due to the existence of the bump inclined surface 211, the inner side of the pressing bump 21 presses the outer side of the arm bump 131 to make the whole arm bump 131 contract inward. When the whole arm bump 131 contracts inward, the gap between the inner side of the arm bump 131 and the lead wire gradually decreases and finally disappears. At this time, the inner side of the arm bump 131 presses the outer side of the lead wire, thereby restricting the movement of the wire in the axial direction and realizing the locking function.

The sleeve 10 adopts a precision injection molding process to meet the size requirement of the sleeve 10 by controlling equipment accuracy and mold error. The injection molding process is controlled by a mold clamping force, injection position measurement accuracy, an injection speed, an injection pressure and mold temperature, so as to meet the dimensional accuracy requirements for pre-assembly and rotation, as well as the operational requirements for rotational force. The specific parameters are as follows: when the mold clamping force is zero, it is less than 0.03 mm; when the mold clamping force is maximum, it is less than 0.005 mm; the injection position accuracy (end point of pressure maintenance) is less than 0.03 mm; the injection speed is greater than or equal to 300 mm/s; the injection pressure shall be greater than 25 MPa; the mould temperature variation shall be controlled within ±1° C.

The sleeve 10 and the cable duct 11 adopts automatic assembly process, the assembly procedure is controlled by automatic assembly tooling, so as to meet the requirements of the pre-assembly force, smooth coordination of L-shaped trajectory movement, the rotation force, the locking force, no wrong installation, no missed installation, no reverse installation, and the like. Main structure of automatic assembly tooling includes an industrial control computer, an air cylinder, a lead screw, a slide rail, a positioning structure, a guiding mechanism, an error-proof mechanism, etc.

The foregoing is merely an illustrative embodiment of the present disclosure and is not intended to limit the scope of the present disclosure. Any equivalent changes and modifications made by those skilled in the art without departing from the concepts and principles of the present disclosure shall fall within the scope of the present disclosure.

What is claimed is:

1. A cable protection device, comprising:

a sleeve provided with a cable duct; and a locking barrel configured to sleeve outside the cable duct;

wherein an end of the cable duct is provided with a pressing arm and an opening slot adjacent to the pressing arm; and an inner wall of the locking barrel is provided with a pressing bump capable of being inserted into the opening slot, and the pressing bump is configured to rotate with the locking barrel to an outer side of the pressing arm to press the pressing arm to move inward;

wherein the cable protection device comprises a plurality of locking bumps disposed on the outer wall of the cable duct, and a plurality of locking grooves disposed on the locking barrel;

at least one of the locking grooves comprises a circumferential groove portion extending along a planar circumferential line around an axis of the cable duct, and at least one of the locking bumps is rotatable in the circumferential groove portion; and at least one of the locking grooves is a circumferential clamping groove, at least one of the locking bumps is a first locking clamping block capable of being clamped with the circumferential clamping groove to prevent the locking barrel from moving relative to the cable duct in an axial direction of the cable duct, and the first locking clamping block is rotatable in the circumferential clamping groove.

2. The cable protection device according to claim 1, wherein the locking groove comprises an axial groove portion being in communication with the circumferential groove portion, and the axial groove portion is configured to guide the locking bump to enter the circumferential groove portion.

3. The cable protection device according to claim 1, wherein an end of the circumferential groove portion has a locking portion configured to press the locking bump inward by a side wall of the locking portion.

4. The cable protection device according to claim 1, wherein the pressing bump has a bump inclined surface for being in lap joint with the pressing arm, and the bump inclined surface guides the pressing bump to rotate to the outer side of the pressing arm when the locking barrel is rotated.

5. The cable protection device according to claim 1, wherein an inner wall of the pressing arm is provided with an arm bump.

6. The cable protection device according to claim 1, wherein the first locking clamping block comprises a clamping block upright plate configured to abut against an inner wall of the circumferential clamping groove.

7. The cable protection device according to claim 6, wherein the first locking clamping block comprises a clamping block rib plate connected to the clamping block upright plate.

8. A cable protection device, comprising:

a sleeve provided with a cable duct; and a locking barrel configured to sleeve outside the cable duct;

wherein an end of the cable duct is provided with a pressing arm and an opening slot adjacent to the pressing arm; and an inner wall of the locking barrel is provided with a pressing bump capable of being inserted into the opening slot, and the pressing bump is configured to rotate with the locking barrel to an outer side of the pressing arm to press the pressing arm to move inward;

the cable protection device comprises at least one locking bump and at least one locking groove;

at least one locking bump is disposed on an outer wall of the cable duct and at least one locking groove is disposed on the locking barrel; and/or at least one locking bump is disposed on the inner wall of the locking barrel and at least one locking groove is disposed on the cable duct; and the locking bump is configured to be embedded in the locking groove to define the position of the locking barrel on the cable duct;

the locking groove comprises a spiral groove portion extending along a spiral line around an axis of the cable duct.

* * * * *